Jan. 3, 1933.　　　　P. E. LEHR　　　　1,892,957
PLANIMETER
Filed April 23, 1930　　　2 Sheets-Sheet 1
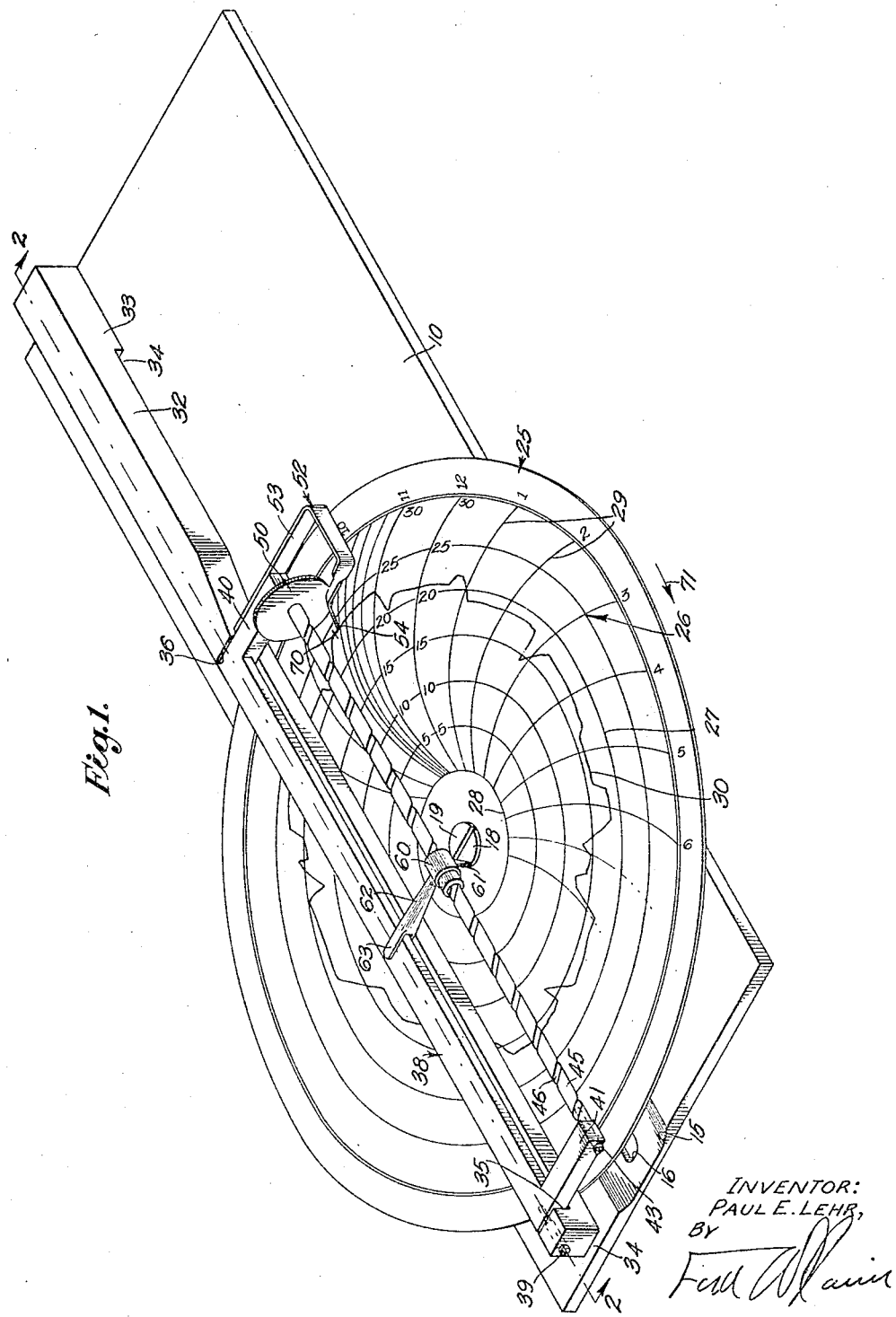
Fig.1.
INVENTOR:
PAUL E. LEHR,
BY
ATTORNEY.

Jan. 3, 1933.  P. E. LEHR  1,892,957
PLANIMETER
Filed April 23, 1930   2 Sheets-Sheet 2
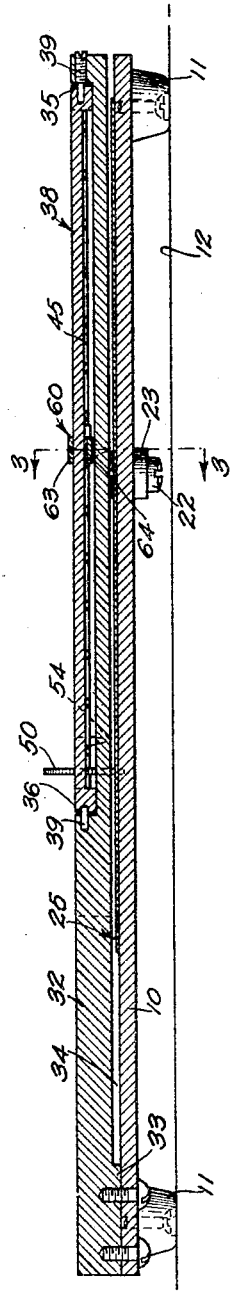
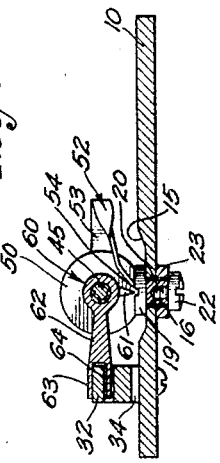
INVENTOR:
PAUL E. LEHR
BY
ATTORNEY.

Patented Jan. 3, 1933

1,892,957

UNITED STATES PATENT OFFICE

PAUL E. LEHR, OF OILFIELDS, CALIFORNIA

PLANIMETER

Application filed April 23, 1930. Serial No. 446,619.

My invention relates to planimeters, and more particularly to an averaging planimeter of the radial type such as is used on circular charts for determining the average radius of a curve drawn thereon.

It is often desirable to be able to record values of a variable such as temperature, pressure, liquid-level, etc. over a period of time so that a permanent record of instantaneous values may be kept. This is usually done by rotating a chart as a function of time and drawing a curve thereon as a function of the variable which is to be recorded, the radial distance from a given zero line on the chart representing the value of the variable at any instant of time.

In certain instances it is desirable to be able to determine the average reading of such a chart over a given period of time, this period usually being a twenty-four hour one represented by a full revolution of the chart. Various devices have been designed to accomplish this end, all of which are expensive to manufacture due to the necessity of providing accurately graduated scales and verniers. Further it has heretofore been necessary to use transformation charts or factors to interpret the reading of the instrument scales in terms of the variable recorded on the chart. In order to obtain direct readings it has heretofore been necessary to design an instrument for use with a single type of chart.

It is a primary object of this invention to provide an averaging planimeter which itself carries no graduated scale requiring the use of transformation charts or factors, but which instead gives a direct reading of the desired average by utilizing the calibrations on the chart itself.

A further object of the invention is to provide such an instrument which is much simpler to construct and use than are existing instruments, and one which is especially adapted to portable use inasmuch as it is not susceptible to breakage or inaccuracies due to rough handling.

In the preferred form of the invention I provide a chart-holding means movable relative to a base, and an indicator moving along a threaded shaft, this indicator extending in indicating relationship with the calibrations of the chart. A planimeter wheel contacts the chart and is turned by a relative movement between the chart and this wheel, the indicator being moved as a function of the angular movement of the planimeter wheel. In addition, the perferred form carries a pointer means which is made to follow the curve on the chart.

It is an important object of this invention to provide an averaging planimeter of this type in which the point of contact between the planimeter wheel and chart lies on a radius which passes through the pointer means and which is drawn through the center of the chart.

A further object of the invention is to provide such a planimeter in which the pointer means is spaced a given distance from the planimeter wheel and in which a reference means is utilized to preliminarily determine the starting position of the indicator, this reference means being spaced from the center of the chart a distance equal to said given distance.

A further object of the invention is to provide a planimeter including a planimeter wheel engaging the upper surface of a chart directly above a shallow channel formed in the base member which supports the chart.

Still a further object of the invention is to provide a planimeter applicable to any circular chart which is uniformly graduated. It is also possible to adapt the planimeter of my invention to other types of charts which are not uniformly graduated by suitably designing the screw which interconnects the pointer and the planimeter wheel.

A further object of the invention is to provide a planimeter in which the chart is rotated relative to the planimeter mechanism rather than moving this mechanism relative to the chart, the former system being preferable due to the lack of inertia forces which must be overcome in making the pointer follow the curve.

Further objects lie in the specific construction of the instrument and will be made evident hereinafter.

Referring to the drawings, in which I have illustrated a preferred form,

Fig. 1 is an isometric view of my planimeter showing the mechanism in starting position.

Fig. 2 is a sectional view taken on the line 2—2 of Fig. 1.

Fig. 3 is a sectional view taken on the line 3—3 of Fig. 2.

Referring to these drawings, the averaging planimeter of my invention includes a base 10 providing rubber posts 11 which support the base 10 a distance above the surface 12 on which the planimeter rests. Formed in the upper surface of this base is a shallow channel 15 best shown in Figs. 1 and 3, and the material remaining in the bottom of this channel is cut away to form an elongated opening 16 of uniform width and extending through a substantial portion of the length of the channel 15.

Adapted to slide along this elongated opening is a chart holder 18 providing a flat head 19 positioned in the channel 15 and extending a slight distance above the upper face of the base 10. This chart holder 18 also provides a shank 20 which extends through the opening 16 and which is threaded at its lower end to receive the shank of a screw 22. A washer 23 is positioned between the head of the screw 22 and the lower surface of the base 10, this washer being of such a thickness that the chart holder 18 slides freely along the elongated opening 16.

Adapted to be positioned on the chart holder 18 is a chart 25 of the circular type, this chart including a central opening which snugly fits over the head 19 of the chart holder 18, thus allowing the chart to be turned around the vertical axis of this chart holder, and also to be moved in a direction parallel to the axis of the elongated opening 16. This chart is of the conventional type providing calibrations 26 which, in the form shown, comprise equally spaced graduation lines 27 which are concentric with each other, the innermost of these graduation lines forming a zero line indicated by the numeral 28. Intersecting the graduation lines 27 are time-indicating lines 29 which, in the form shown, are formed on the arc of a circle due to the construction of the instrument which is used for drawing a curve on this chart. Thus, if a curve of pressure against time is desired, the pointer drawing the curve moves through the arc of a circle corresponding in curvature to the time-indicating lines 29, and if the chart 25 is driven by suitably timed mechanism, a curve 30 is drawn on the chart. From an inspection of such a curve it is possible to determine the value of the pressure at any time.

A supporting arm 32 is mounted in spaced relationship with the upper surface of the base 10 by any suitable means. In Fig. 1 this means is shown as comprising a spacer 33 formed on one end of this arm and secured to the base 10, the other end of this arm being unsupported and being spaced from the upper surface of the base 10 to provide a chart-receiving space 34.

The supporting arm 32 includes a cut-away portion which is bounded by vertical surfaces 35 and 36. Pivotally mounted in this cut-away portion is a frame 38 each end of which is bored to receive the inward end of a pin 39 mounted in the supporting arm 32 and extending inward from the vertical faces 35 and 36. The pin on the free end of the supporting arm is preferably so formed as to be easily removable to permit the frame to be easily secured in place. This frame 38 is of such a length as to substantially fill the cut-away portion between the vertical faces 35 and 36 so that no movement of this frame along the arm 32 can take place.

Formed on opposite ends of the frame 38 are arms 40 and 41 which extend over the shallow channel 15, the free ends of these arms carrying pins 43 which are easily removable therefrom, these pins being of such a length as to extend inward from the arms and provide a pivot means for a threaded shaft 45 extending therebetween. The axis of this threaded shaft lies directly above the axis of the chart holder 18 and lies parallel to the axis of the elongated opening 16, and the threads formed thereon have a relatively steep pitch, as will be hereinafter explained, these threads being indicated by the numeral 46 and in the preferred form taking the form of a helical groove cut in the shaft 45.

That end of the threaded shaft 45 which is pivoted in the arm 40 carries a planimeter wheel 50 which is suitably secured to the shaft in a plane perpendicular to the axis thereof. Also secured to the arm 40 is a pointer means 52 comprising an arm 53 extending forward and being bent to extend across the front of the planimeter wheel 50, the free end thereof being bent to extend inward and downward to form a pointer 54 which lies close to the calibrations of the chart 25. In the preferred embodiment of my invention I so position the pointer 54 that the tip thereof lies on a radius drawn from the vertical axis of the chart holder 18 through the point of contact between the chart and the planimeter wheel 50.

Threaded on the shaft 45 is an indicator 60 providing a point 61 extending downward into close proximity to the upper surface of the chart 25 in indicating relationship with the calibrations 26 thereon. This point is, however, made of such a length that it clears the head 19 of the chart holder 18 by a small margin when the shaft 45 is rotated. This indicator carries an arm 62 which extends rearward and which is bifurcated to provide extensions 63 and 64 lying respectively above and below the frame 38 so as to be slidable therealong. The arm 62 prevents any rotation of the indicator on the shaft 45.

The instrument thus described is of the radially off-set type, this term not being restricted to the sense sometimes used with such instruments wherein the planimeter wheel 50 is radially disaligned from the pointer 54, but being used in the sense that the planimeter wheel 50 is spaced from the pointer 54 in a radial direction. When this form of instrument is used, it is necessary to provide a reference means adjacent which, point 61 of the indicator is positioned before rotating the chart to determine the average radius of the curve 30 thereon. This reference means must be somehow associated with the axis of the chart, and in the preferred form the periphery of the head 19 of the chart holder 18 is used for this purpose. Thus, in Fig. 1 I have shown the point 61 as lying directly above the periphery of the chart holder 18, this being the correct starting position for the instrument shown. It should not be understood, however, that I am limited to the use of the periphery of the chart holder as constituting this reference means. It is also possible to inscribe a circle on the chart holder 18 which may be used for a reference means. It is important to note, however, that the distance between the vertical axis of the chart holder 18 and the reference means utilized should be equal to the radial distance between the pointer 54 and the point of contact between the planimeter wheel 50 and the chart 25.

It should not be inferred, however, that I am limited to this radial off-set system. In some instances it is possible to use the planimeter wheel 50 as a pointer means for following the curve 30. In such a system the distance between the pointer means and the point of contact of the planimeter wheel 50 and chart 25 would, of course, be equal to zero, and the reference means would thus correspond to the vertical axis of the chart holder 18.

In the operation of the form shown in Fig. 1, an arbitrary starting point 70 lying on the curve 30 is suitably marked and brought under the pointer 54. It is usually preferable with the form of instrument herein described in detail to select the point 70 at or near the maximum value of the curve 30. The forward end of the frame 38 is then momentarily lifted and the shaft 45 rotated until the point 61 of the indicator 60 lies above the reference means, in the form shown this reference means being the periphery of the chart holder 18. The frame 38 is then lowered, and the mechanism is in the starting position shown in Fig. 1. The operator rotates the chart 25 in a direction indicated by the arrow 71 of Fig. 1, this being done by manual engagement with the chart. By moving the chart to the right or to the left during this rotation it is possible to make the pointer 54 follow the curve 30. After the complete curve has been traced and the pointer 54 again lies directly above the starting point 70 previously indicated on the curve 30, the operator notes the position of the pointer 61 with relation to the graduation lines 27. It will be found that if the threaded shaft 45 is suitably designed with relation to the diameter of the planimeter wheel 50, the point 61 will lie directly above that graduation line representing the average value of the curve 30.

The theoretical considerations involved in the design of my planimeter are quite simple, and the equations for designing an instrument which is not radially off-set will be given. Thus, assuming that the planimeter wheel 50 is to be the pointer means, and assuming for the purpose of simplicity that the wheel is to follow a circle the radius of which is represented by R, this radius being taken with respect to the vertical axis of the chart holder 18, and assuming the diameter of the planimeter wheel to be represented by a value D, it follows that if the planimeter wheel is run around the circle of the radius R, the revolutions of this planimeter wheel would be equal to $$N = \frac{2\pi R}{\pi D} \text{ revolutions.}$$

Inasmuch as we desire the indicator 60 to move a distance R, and inasmuch as this distance is directly proportional to N, the number of revolutions of the planimeter wheel, and inversely proportional to X, which is the number of threads per inch on the screw 45, it follows that $$R = \frac{N}{X}$$

Substituting the second equation in the first, we obtain $$N = \left(\frac{2\pi}{\pi D}\right)\left(\frac{N}{X}\right) = \frac{2N}{DX}, \text{ or } X = \frac{2}{D}$$

It is important to note that the variables D and X are independent of the number of revolutions, thus making it possible to use my instrument on all charts having uniformly spaced graduation lines, regardless of the values attached thereto. From the above equation it will be readily seen that if the planimeter wheel is so formed as to have a diameter of one inch, the number of threads per inch which must be formed on the threaded shaft 45 is equal to 2.

These equations are equally applicable to a planimeter of the off-set type such as shown in Fig. 1 if it is remembered that the distance between the axis of the chart and holder 18 and the reference means is equal to the distance between the pointer 54 and the point of contact of the planimeter wheel 50. It is obviously preferable in most cases to use the off-set type inasmuch as the pointer means may be spaced from the planimeter wheel 50 thus giving an operator a clear view of this pointer means and tending to make possible a more accurate following of the curve 30.

It should be understood that I am not limited to a reference means formed on the chart holder 18; this reference means might be on the chart itself or, in fact, might be indicated by a scratch on the frame 38, with some portion of the arm 62 being brought adjacent this scratch to bring the indicator 60 into its starting position.

Furthermore, my invention is not limited to an instrument wherein the indicator 60 moves to the right during the time that the pointer means is following the curve 30. By reversing the threads 46 on the threaded shaft 45 it is possible to make this indicator move leftward and indicate diametrically opposite from the pointer means 52.

An important feature of the invention lies in the forming of the shallow channel 15 in the base 10 so that the weight supported by the planimeter wheel 50 slightly depresses the chart 25 into this channel, thus giving more surface of contact between the planimeter wheel and the upper surface of the chart 25. It is, however, desirable not to make this surface of contact too large for otherwise the accuracy of the instrument might be impaired.

I claim as my invention:

1. In combination in a planimeter adapted to determine the average value of a curve drawn on a circular chart: a base adapted to hold said chart; an indicator movably mounted relative to said base and positioned a short distance from said chart in a manner to move over the calibrations thereon in indicating relationship; pointer means extending adjacent said chart; and means drivably connected to said indicator and adapted by engagement with said chart for moving said indicator relative to said calibrations when a relative movement between said chart and said pointer means is effected so that said indicator constantly indicates upon said chart the average value of the curve traced by said pointer means.

2. In combination in a planimeter adapted to determine the average value of a curve drawn on a circular chart: a base adapted to hold said chart; an indicator movably mounted relative to said base and positioned a short distance from said chart in a manner to move over the calibrations thereon in indicating relationship; pointer means extending adjacent said chart; a planimeter wheel contacting said chart and rotated when a relative movement between said chart and said pointer means takes place; and drive means operatively connecting said indicator and said planimeter wheel to move said indicator as a function of the amount of movement of said planimeter wheel so that said indicator indicates without adjustment upon said chart the average value of the curve traced by said pointer means.

3. In combination in a planimeter adapted to determine the average value of a curve drawn on a circular chart: a base adapted to hold said chart; an indicator movably mounted relative to said base and positioned a short distance from said chart in a manner to move over the calibrations thereon in indicating relationship; pointer means extending adjacent said chart; a planimeter wheel contacting said chart and rotated when a relative movement between said chart and said pointer means takes place, the point of contact between said planimeter wheel and said chart being radially aligned with said pointer means; and drive means operatively connecting said indicator and said planimeter wheel to move said indicator as a function of the amount of movement of said planimeter wheel.

4. In combination in a planimeter adapted to determine the average value of a curve drawn on a circular chart: a base adapted to hold said chart; an indicator movably mounted relative to said base and positioned a short distance from said chart in a manner to move over the calibrations thereon in indicating relationship; pointer means extending adjacent said chart; a planimeter wheel contacting said chart and rotated when a relative movement between said chart and said pointer means takes place; reference means associated with said chart adjacent which said indicator is positioned at starting to determine the average value of said curve; and drive means operatively connecting said indicator and said planimeter wheel to move said indicator as a function of the amount of movement of said planimeter wheel.

5. In combination in a planimeter adapted to determine the average value of a curve drawn on a circular chart: a base adapted to hold said chart; an indicator movably mounted relative to said base and positioned a short distance from said chart in a manner to move over the calibrations thereon in indicating relationship; pointer means extending adjacent said chart; a planimeter wheel contacting said chart and rotated when a relative movement between said chart and said pointer means takes place, said pointer means being spaced a given distance from the point of contact with said planimeter wheel and said chart; reference means associated with said chart and spaced from the center thereof a distance equal to said given distance, said reference means being the starting point for the travel of said indicator; and drive means operatively connecting said indicator and said planimeter wheel to move said indicator as a function of the amount of movement of said planimeter wheel.

6. In combination in a planimeter adapted to determine the average value of a curve drawn on a circular chart: a chart-holding means; a planimeter wheel contacting said chart and adapted to be turned by a relative movement of said chart and said planimeter wheel; pointing means radially spaced from the point of contact of said chart and said planimeter wheel; an indicating means independent of said planimeter wheel; and connecting means so associating said indicating means and said planimeter wheel that said indicating means is moved as a function of the amount of rotation of said planimeter wheel.

7. In combination in a planimeter adapted to determine the average value of a curve drawn on a circular chart: a base adapted to hold said chart; a shallow channel formed in said base; a frame mounted above said chart; and a planimeter wheel rotatably mounted in said frame and contacting said chart at a point above said channel whereby said chart is depressed slightly.

8. A combination as defined in claim 7 in which an opening is formed in the bottom of said channel and including a chart holder slidable in said opening along said channel.

9. In combination in a planimeter adapted to determine the average value of a curve drawn on a circular chart: a base; a chart holder slidable relative to said base; a threaded shaft rotatably mounted above said chart; an indicator threaded on said shaft and extending adjacent calibrations on said chart in indicating relationship; and a planimeter wheel drivably connected to said threaded shaft.

10. In combination in a planimeter adapted to determine the average value of a curve drawn on a circular chart: a base; a chart holder slidable relative to said base; a threaded shaft rotatably mounted above said chart; an indicator threaded on said shaft and extending adjacent calibrations on said chart in indicating relationship; a planimeter wheel drivably connected to said threaded shaft; a pointer means adjacent said chart and spaced from said planimeter wheel a given distance; and reference means carried by said chart holder and spaced from the center thereof a distance equal to said given distance.

11. In combination in a planimeter adapted to determine the average value of a curve drawn on a circular chart: a base; a supporting arm mounted on said base but spaced a distance therefrom for a portion of its length to provide a space into which said chart may extend; a frame mounted in said supporting arm; a threaded shaft pivoted in said frame; a planimeter wheel secured to said shaft and contacting said chart; and an indicator threaded on said shaft and movable therealong when a relative movement between said chart and said planimeter wheel takes place, said indicator extending close to said chart in indicating relationship with the calibrations thereon.

12. In combination in a planimeter adapted to determine the average value of a curve drawn on a circular chart: a base; a supporting arm mounted on said base but spaced a distance therefrom for a portion of its length to provide a space into which said chart may extend; a frame mounted in said supporting arm; a threaded shaft pivoted in said frame; a planimeter wheel secured to said shaft and contacting said chart; an indicator threaded on said shaft and movable therealong when a relative movement between said chart and said planimeter wheel takes place, said indicator extending close to said chart in indicating relationship with the calibrations thereon; and an arm on said indicator and slidable along said frame to prevent any rotation of said indicator about the axis of said shaft.

13. In combination in a planimeter adapted to determine the average value of a curve drawn on a circular chart: a base; a supporting arm mounted on said base but spaced a distance therefrom for a portion of its length to provide a space into which said chart may extend; a frame pivotally mounted in said supporting arm; a threaded shaft pivoted in said frame; a planimeter wheel secured to said shaft and contacting said chart; and an indicator threaded on said shaft and movable therealong when a relative movement between said chart and said planimeter wheel takes place, said indicator extending close to said chart in indicating relationship with the calibrations thereon.

14. In combination in a planimeter adapted to determine the average value of a curve drawn on a chart: supporting means for said chart; an indicating member movably mounted relative to said supporting means and in indicating relationship with calibrations on said chart; and means actuated by the relative movement between said chart and said supporting means for moving said indicating member to continuously indicate directly upon said chart the average value of said curve during said relative movement.

15. In combination in a planimeter adapted to determine the average value of a curve drawn on a chart: supporting means adapted for supporting said chart, said chart being rotatable and movable in a predetermined path relative to said supporting means so that a point fixed relative to said supporting means may trace said curve; an indicating member movably mounted relative to said supporting means and in indicating relationship with calibrations on said chart; and means actuated by the relative movement of said chart and said supporting means for moving said indicating member to indicate upon said calibrations said average value.

16. In combination in a planimeter adapted to determine the average value of a curve drawn on a chart: supporting means adapted for supporting said chart, said chart being rotatable and movable in a predetermined path relative to said supporting means so that a point fixed relative to said supporting means may trace said curve; a supporting member parallel to said path; an indicating member movably associated with said supporting member in indicating relationship with calibrations on said chart; and drive means actuated by the relative movement of said chart and said supporting means for moving said indicating member relative to said supporting member to indicate said average value upon said calibrations.

17. In combination in a planimeter adapted to determine the average value of a curve drawn on a chart: a base providing a shallow channel; a chart holder slidable relative to said base; a threaded shaft rotatably mounted adjacent said chart; an indicator threaded on said shaft and extending adjacent calibrations on said chart in indicating relationship; a planimeter wheel drivably connected to said threaded shaft and contacting said chart above said channel whereby said chart is depressed slightly; a pointer means adjacent said chart and spaced from said planimeter wheel a given radial distance; and reference means defining a starting point for said indicator and spaced from the center of said chart a distance equal to said given radial distance.

18. In combination in a planimeter adapted to determine the average value of a curve on a circular chart: a base adapted to hold said chart; a shallow channel formed in said base; a frame mounted adjacent said chart; a planimeter wheel rotatably mounted in said frame and contacting said chart at a point above said channel whereby said chart is depressed slightly; and reference means adjacent said chart for indicating the position of said indicator before starting to determine the average value of said curves.

19. In combination in a planimeter adapted to determine the average value of a curve drawn on a chart: a base providing a shallow channel; a chart holder slidable relative to said base and adapted for rotatably supporting said chart; a threaded shaft rotatably mounted adjacent said chart; an indicator threaded on said shaft and extending adjacent calibrations on said chart in indicating relationship; a planimeter wheel drivably connected to said threaded shaft and contacting said chart above said channel whereby said chart is depressed slightly; and a pointer means adjacent said chart.

In testimony whereof, I have hereunto set my hand at Los Angeles, California, this 19th day of April, 1930.

PAUL E. LEHR.